Feb. 12, 1952     A. G. GURRIES     2,585,117
ROLLER ATTACHMENT FOR SCRAPERS
Filed April 9, 1945     2 SHEETS—SHEET 1
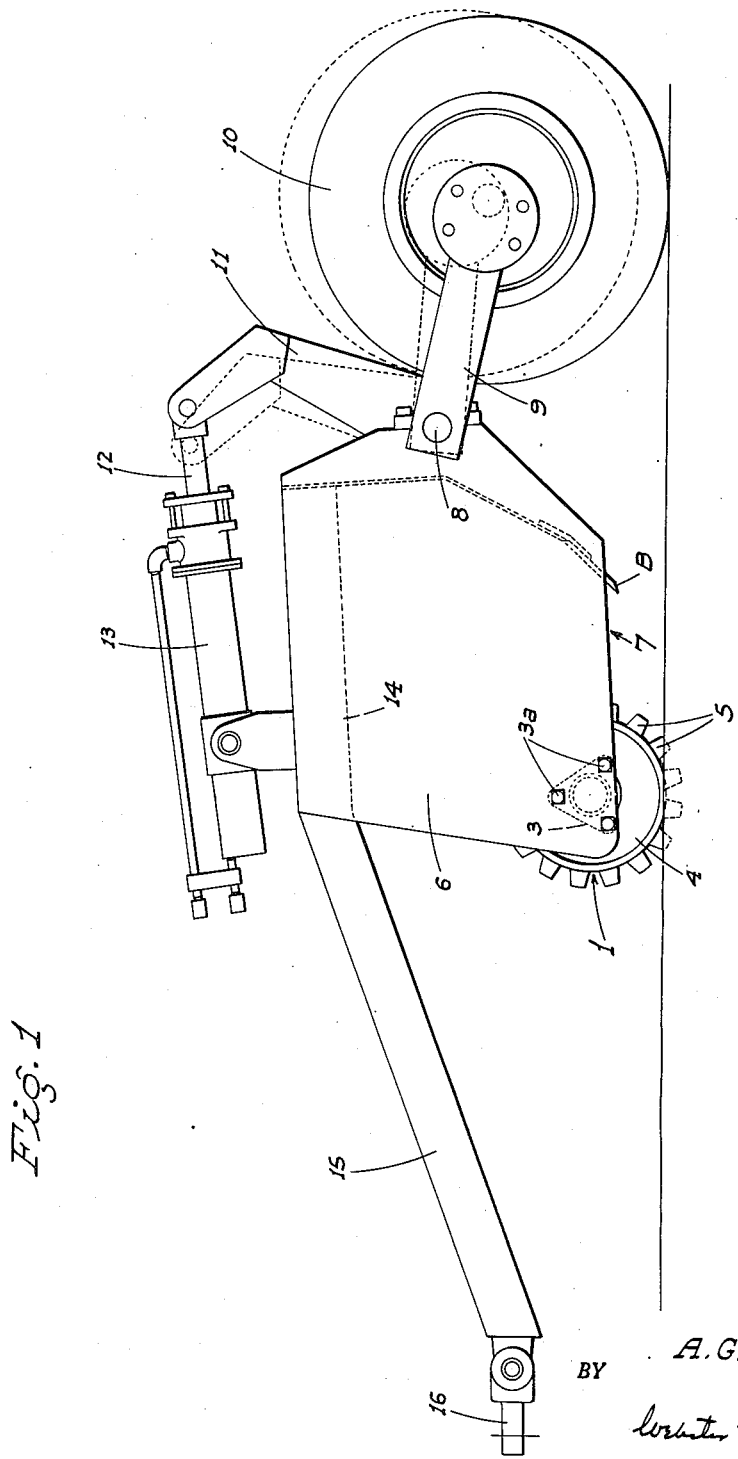
INVENTOR.
A. G. Gurries
BY
ATTYS

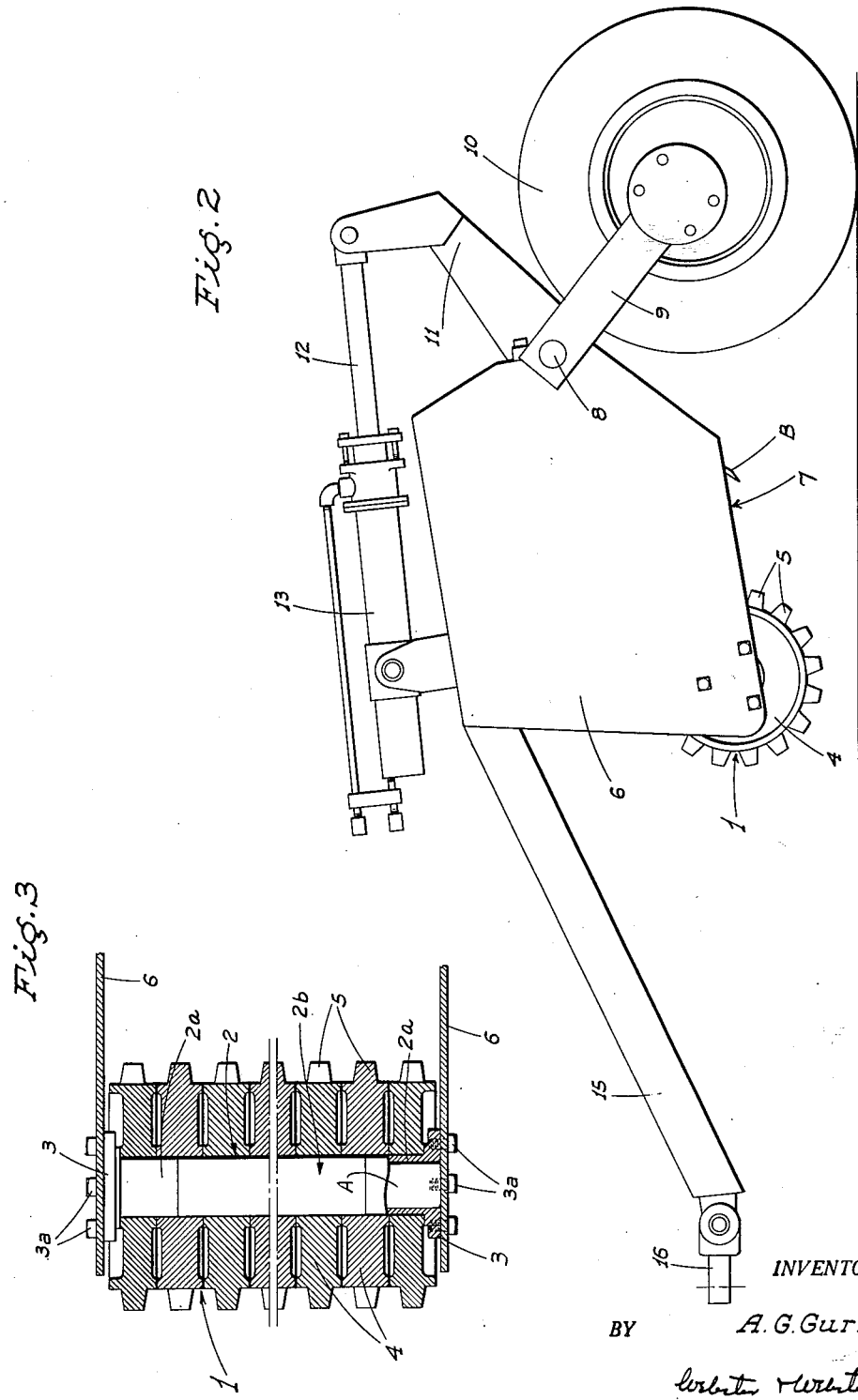

Patented Feb. 12, 1952

2,585,117

UNITED STATES PATENT OFFICE 2,585,117

ROLLER ATTACHMENT FOR SCRAPERS

Albert G. Gurries, Gilroy, Calif., assignor to Be-Ge Manufacturing Co., Gilroy, Calif., a corporation of California Application April 9, 1945, Serial No. 587,277

1 Claim. (Cl. 55—49)

This invention relates generally to an improved earth working implement.

In particular the invention is directed to, and it is an object to provide, an earth working implement which comprises a vertically adjustable, wheel supported frame adapted to be connected to a tractor in draft relation, and a ground conditioning roller unit rigidly suspended from the frame for vertical adjustment therewith.

Another object of the invention is to provide an implement as in the preceding paragraph, in which vertical adjustment of the frame is accomplished through a medium of a vertically swingable wheel mount included in the implement; there being a power cylinder connected to said mount in operative relation.

A further object of the present invention is to provide, in combination with a scraper having a bowl including transversely spaced side plates, a transverse roller unit arranged to be detachably connected between said side plates in supported relation; the bottom of the roller unit depending below the lower edges of the side plates for ground engagement.

An additional object is to provide a combination, as in the preceding paragraph, in which the scraper includes power actuated, vertically adjustable, ground engaging wheels; said wheels being adjustable to vary the elevation of said bowl and roller unit.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views:

Figure 1 is a side elevation of a scraper with the roller unit attached to the bowl; said unit being shown in ground working position.

Figure 2 is a similar view, but illustrates the roller unit elevated clear of the ground.

Figure 3 is a fragmentary sectional plan view of the roller unit as attached to the side plates of the scraper bowl.

Referring now more particularly to the characters of reference on the drawings, the roller unit is indicated generally at 1 and comprises a transverse tubular beam unit indicated generally at 2 formed at the ends with enlarged radial attachment flanges 3. A row of separate soil conditioning rings or roller elements 4 is mounted on the beam 2 and extends from end to end thereof; said rings being independently turnable on the beam and each ring including outwardly projecting teeth 5. In order that the rings may be mounted on or removed at any time from beam 2 even though the enlarged flanges 3 are integral with said beam, the latter, as plainly indicated in Fig. 3, comprises end sections 2a and a separate intermediate section 2b, all disposed in abutting relation when mounted. In order to maintain these separate and unconnected parts in axial alinement, a floating axle A, substantially the full length of beam 2, is mounted therein as shown.

The above roller unit 1 is adapted to extend transversely between and to be detachably mounted in connection with, the spaced side plates 6 of the bowl 7 of a drag type scraper as shown; the flanges 3 abutting against said side plates and being detachably secured thereto by bolts 3a.

The roller unit is mounted ahead of the cutting blade B of the bowl and so that the bottom portion of said roller unit is disposed below the lower edges of the side plates 6. Upon lowering of the bowl 7 from an elevated position as in Fig. 2 to a lowered position as in Fig. 1, said roller unit rides the ground; the extent of ground engagement being controllable from the power actuated wheel mount which the scraper includes and which is constructed as follows:

At the back of the bowl the scraper includes a horizontal cross shaft 8 having transversely spaced radial arms 9 projecting rearwardly therefrom; wheels 10 being spindle mounted in connection with the rear ends of said arms. An upstanding lever 11 is fixed on shaft 8 intermediate arms 9, and the upper end of lever 11 is connected to the piston rod 12 of a double acting, fluid pressure power cylinder 13 mounted on the scraper frame 14 above bowl 7. The wheels 10 and bowl 7 are thus vertically adjusted relative to each other upon operation of the power cylinder 13 by reason of the bell crank mount including shaft 8, arms 9, and lever 11.

The scraper includes a forwardly projecting draft unit 15, disposed at a downward incline from frame 14, adapted for connection with a tractor by means of a hitch 16.

When the roller unit 1 is mounted on the scraper for use, the power cylinder 13 is actuated to relatively raise the wheels and lower the bowl 7 until said roller unit rides the ground in working relation thereto. The depth of penetration of the roller unit into the ground can be regulated with nicety by means of said power cylinder 13. If desired the wheels 10 can be raised clear of the ground, as shown in dotted lines in Fig. 1, to impart the full weight of the scraper to the roller unit if soil conditions so require.

To use the scraper, the flanges 3 are detached from the side plates 6 whereupon the roller unit 1 is readily removed from the implement.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention the following is claimed as new and useful and upon which Letters Patent is desired:

A roller assembly for detachable mounting on an implement which includes depending side plates and a draft beam extending forwardly from the plates at the top and adapted to be tractor-supported at its forward end; said assembly comprising a roller unit, a cylindrical support for the roller unit having end flanges adapted to pass closely between the side plates, and bolts removably securing the flanges and plates; said roller unit being of lesser diameter than the distance from ground to the draft beam and the length of the latter from the plates to the forward tractor-supported end thereof being considerably in excess of the diameter of the roller unit whereby the roller unit may be mounted in place on or removed from the implement upon relative longitudinal ground-supported movement thereof and therebetween and without interference from the tractor.

ALBERT G. GURRIES.

REFERENCES CITED

The following references are of record in the file of this patent:

UNITED STATES PATENTS

| Number | Name | Date |
|---|---|---|
| 222,362 | Mooers | Dec. 9, 1879 |
| 601,775 | Goodhue | Apr. 5, 1898 |
| 1,260,573 | Pitman | Mar. 26, 1918 |
| 1,931,766 | LeTourneau | Oct. 24, 1933 |
| 2,208,526 | Gurries | July 16, 1940 |
| 2,358,863 | LeTourneau | Sept. 26, 1944 |

FOREIGN PATENTS

| Number | Country | Date |
|---|---|---|
| 186,467 | Switzerland | Dec. 1, 1936 |
| 686,622 | Germany | Jan. 13, 1940 |